(12) United States Patent
Thijssen (10) Patent No.: US 8,947,825 B2
(45) Date of Patent: Feb. 3, 2015

(54) LOW COST HIGH PERFORMANCE HARD DRIVE BASE

(75) Inventor: Hendrikus Thijssen, Singapore (SG)

(73) Assignee: MMI Precision Forming Pte Ltd., Singapore (SG)

( * ) Notice: Subject to any disclaimer, the term of this patent is extended or adjusted under 35 U.S.C. 154(b) by 0 days.

(21) Appl. No.: 13/695,564

(22) PCT Filed: May 9, 2011

(86) PCT No.: PCT/SG2011/000180
§ 371 (c)(1),
(2), (4) Date: Feb. 13, 2013

(87) PCT Pub. No.: WO2011/139239
PCT Pub. Date: Nov. 10, 2011

(65) Prior Publication Data
US 2013/0208415 A1    Aug. 15, 2013

(30) Foreign Application Priority Data

May 7, 2010    (GB) .................................. 1007639.6

(51) Int. Cl.
| G11B 33/12 | (2006.01) |
| G11B 33/02 | (2006.01) |
| G11B 25/04 | (2006.01) |
| G06F 1/16  | (2006.01) |

(52) U.S. Cl.
CPC .............. *G11B 33/02* (2013.01); *G11B 33/025* (2013.01); *G11B 25/043* (2013.01); *G06F 1/16* (2013.01)
USPC .................... 360/99.16; 360/99.17

(58) Field of Classification Search
CPC .... G11B 33/02; G11B 33/022; G11B 33/025; G11B 33/08; G11B 33/123
USPC ........................................... 360/99.15–99.18
See application file for complete search history.

(56) References Cited

U.S. PATENT DOCUMENTS

| 4,553,183 | A | * | 11/1985 | Brown et al. .............. 360/99.16 |
| 4,814,914 | A | * | 3/1989  | Hagiwara et al. .......... 360/98.08 |
| 5,235,482 | A | * | 8/1993  | Schmitz ..................... 360/99.22 |
| 5,414,574 | A | * | 5/1995  | Boutaghou et al. ........ 360/99.17 |
| 5,587,855 | A | * | 12/1996 | Kim ........................... 360/99.16 |
| 5,650,896 | A |   | 7/1997  | Viskochil |
| 5,657,183 | A | * | 8/1997  | Ycas et al. ................. 360/99.16 |
| 5,770,133 | A | * | 6/1998  | Boutaghou ................. 264/135 |
| 5,898,537 | A | * | 4/1999  | Oizumi et al. ............. 360/99.18 |

(Continued)

FOREIGN PATENT DOCUMENTS

| JP | 04040691 A | * | 2/1992 |
| JP | 10144069 A | * | 5/1998 |

(Continued)

OTHER PUBLICATIONS

Written Opinion of the International Searching Authority for International Application No. PCT/SG2011/000180 dated Jul. 13, 2011.

(Continued)

*Primary Examiner* — Will J Klimowicz
(74) *Attorney, Agent, or Firm* — Tumey L.L.P.

(57) ABSTRACT

The present invention relates to a HDD base comprising: at least two anchor formations for anchoring at least two parts of a HDD; and a rigid member configured to retain anchor formations in a fixed position relative to each other.

25 Claims, 8 Drawing Sheets

(56) References Cited

U.S. PATENT DOCUMENTS

| | | | |
|---|---|---|---|
| 6,023,392 A * | 2/2000 | Kim | 360/99.18 |
| 6,034,841 A * | 3/2000 | Albrecht et al. | 360/99.17 |
| 6,055,140 A * | 4/2000 | Marchon | 360/135 |
| 6,278,574 B1 * | 8/2001 | Wakita et al. | 360/99.01 |
| 6,469,864 B2 * | 10/2002 | Kamezawa et al. | 360/97.21 |
| 6,501,614 B1 * | 12/2002 | Kang et al. | 360/99.17 |
| 6,552,870 B2 * | 4/2003 | Komatsu et al. | 360/99.23 |
| 6,900,961 B1 * | 5/2005 | Butler | 360/97.13 |
| 6,982,850 B1 | 1/2006 | Ying | 360/97.16 |
| 7,312,949 B2 * | 12/2007 | Chee et al. | 360/99.15 |
| 7,319,571 B2 * | 1/2008 | Xu et al. | 360/99.15 |
| 7,359,144 B2 * | 4/2008 | Xu et al. | 360/99.21 |
| 7,453,667 B2 * | 11/2008 | Cho et al. | 360/97.19 |
| 7,616,401 B2 * | 11/2009 | Xu et al. | 360/99.16 |
| 7,652,845 B2 * | 1/2010 | Xu et al. | 360/97.12 |
| 7,751,151 B2 * | 7/2010 | Son | 360/256 |
| 7,760,464 B2 * | 7/2010 | Xu et al. | 360/99.16 |
| 2003/0218826 A1 * | 11/2003 | Hong et al. | 360/97.01 |
| 2004/0150909 A1 | 8/2004 | Kimura et al. | |
| 2005/0088777 A1 | 4/2005 | Chee et al. | |
| 2006/0215324 A1 * | 9/2006 | Neal et al. | 360/244 |
| 2007/0271769 A1 * | 11/2007 | Kagata et al. | 29/603.03 |
| 2010/0238590 A1 * | 9/2010 | Tashiro et al. | 360/99.08 |
| 2011/0038074 A1 * | 2/2011 | Viskochil et al. | 360/75 |
| 2011/0317310 A1 * | 12/2011 | Kim et al. | 360/99.08 |

FOREIGN PATENT DOCUMENTS

| | | | |
|---|---|---|---|
| JP | 11353865 A | * | 12/1999 |
| JP | 2000011625 A | * | 1/2000 |
| JP | 2003132619 A | * | 5/2003 |
| JP | 2008287769 A | * | 11/2008 |
| JP | 2009245570 A | * | 10/2009 |
| KR | 2011115393 A | * | 10/2011 |

OTHER PUBLICATIONS

Written Opinion of the International Preliminary Examining Authority for International Application No. PCT/SG2011/000180 dated Apr. 18, 2012.

Notification of Transmittal of International Preliminary Report on Patentability for International Application No. PCT/SG2011/000180 dated Jul. 20, 2012.

PCT International Search Report for International Application No. PCT/SG2011/000180 dated Jul. 18, 2011.

* cited by examiner

LOW COST HIGH PERFORMANCE HARD DRIVE BASE

TECHNICAL FIELD

This present disclosure relates to a hard disk drive (HDD) base. The invention also relates to a novel HDD base comprising a coating deposited thereon.

BACKGROUND

The development of a HDD as a recording and storage medium has evolved rapidly over the last decade. A HDD typically consists of a platter containing a magnetic material for functioning as the main data storage medium and a pair of magneto-resistive heads for "writing" and "reading" data. In known HDDs, the platter is spun at high speeds while information is being written onto the magnetic medium via the modification of its magnetization. Such magnetic modification is usually effected through the magneto-resistive read-and-write heads.

In known HDD configurations, the read-and-write heads of the HDD are held by an actuator arm, which is affixed at a point called the pivot. The actuator arm is then positioned such that the read/write heads hover very closely to the magnetic storage medium, typically within a few nanometers of the magnetic platter. Critical HDD failures can result due to the read and write heads coming into contact with the platter while it is spinning. It is therefore important to protect the HDD from physical impact, which may be sustained during daily usage of the HDD, for instance, by sudden shocks or even by the dropping of laptops.

In conventional HDDs, the sensitive components of the HDD (e.g. the magnetic platter) are usually housed within a HDD casing (which includes a top cover and a base), wherein the casing is typically made of a metal or metallic material to, amongst other uses, impart resistance against physical impact.

However, this may lead to high manufacturing costs due to the volatile prices of the essential raw materials (e.g. aluminum). Also, aluminium, while not the highest density material, still forms a significant fraction of the total weight of the finished HDD. The increased weight of the HDDs can lead to inflated logistics costs, particularly when there is a need to transport the HDDs over long distances and involve either air or sea transport.

Furthermore, due to weight considerations, conventional HDD designs have resorted to using as little metal material as possible for producing the HDD base. Whilst this arguably addresses the weight problem, it also generates a further problem, particularly that of strength or a lack thereof. As lesser metal is used to produce the HDD base, the ability of the HDD to withstand physical trauma also reduces significantly. This can result in a HDD that is easily compromised from otherwise innocuous knocks due to its weaker structural integrity.

More particularly, conventional HDDs, despite being housed in a hard metallic casing, are nevertheless still prone to damage upon experiencing high mechanical impacts. For example, when a HDD is dropped from a distance above ground level, the suffered impact may still cause damage to the HDD, notwithstanding the presence of the metal casing. Some HDDs also have a mechanism that senses shock and rapidly moves the actuator arm into a non-critical area of the disk or into the ramp pad. However, such a mechanism may still be inadequate to prevent damage to the HDD. This may be due to a variety of reasons. For instance, the suffered impact may cause the actuator arm to be dislodged from the ramp pad or from the non-critical area. This may then result in the actuator arm coming into contact with the surface of the magnetic platter, possibly causing disk corruption and loss of data as the read write heads brush abrasively against the magnetic platter. In other words, when a HDD is too weak or floppy, there is a higher risk that the actuator arm may damage the disk when the HDD suffers an impact. Conversely, if the structure of the casing is too rigid, the vibration or shock may be transmitted directly to the HDD components, which is equally undesirable.

In addition, during production of conventional HDD bases, there is a need for meticulous post-machining due to the need to refine the miniature parts that require a more precise outline.

Accordingly, there is a need to provide a HDD base that overcomes, or at least ameliorates, the disadvantages mentioned above. In particular, there is a need to provide a HDD base that is lightweight but at the same time retains or improves mechanical strength. There is also a need to provide a HDD base that is optimized to resist shock and impact whilst being economical to produce and requires minimal or no post-machining at all.

SUMMARY

In a first aspect, there is provided a HDD base comprising: at least two anchor formations for anchoring at least two parts of a HDD; and a rigid member configured to retain said anchor formations in a fixed position relative to each other. In one embodiment, there are at least three anchor formations on the HDD.

In a further embodiment, the three anchor formations are respectively configured to couple to and anchor the motor hub, ramp pad and pivot emboss of the HDD.

In yet another embodiment, the rigid member may be configured to hold the at least two or more anchor formations in a common plane. Advantageously, the rigid member, is capable of substantially reducing the relative motion of the motor hub, ramp pad and pivot emboss relative to one another. Advantageously, in so doing, the rigid member is capable of keeping critical positions in the HDD (such as the spindle motor, actuator arm pivot and ramp pad) in or about a common plane, thereby securing moving parts in the HDD, e.g. the actuator arm, and prevents damage to the HDD in the event of a physical impact. Also advantageously, the rigid member provides resistance against stress and deformation of the HDD which can be experienced when, for example, the user is resting his arm on the laptop surface, thereby applying stress on the HDD.

In a second aspect, there is provided a HDD comprising a base, the base comprising at least two anchor formations for anchoring at least two parts of a HDD; and a rigid member configured to retain said anchor formations in a fixed position relative to each other.

In another embodiment of the present disclosure, there is provided a HDD base comprising plastic. In one embodiment, the HDD base may be substantially comprised of plastic. The HDD base may be completely made of plastic.

Advantageously, a HDD base made of plastic is more cost effective to produce compared to HDD bases that are constructed from metals such as aluminum. In one embodiment, for a comparably-sized HDD base, cost savings in excess of 50% can be achieved when the HDD base is made from plastic rather than from metal. In another embodiment, cost savings of about 40% is envisaged for producing a plastic HDD base. The cost reduction may be attributed to the reason that the plastic HDD base requires no post-machining and may optionally be coated through a cost effective method, such as sputtering. As such, the production of a plastic HDD base becomes more cost effective compared to conventional HDD bases.

Furthermore, a plastic HDD base can be readily manufactured with precise manufacturing methods such as injection molding, which allows for a relatively more precise construction of the refined parts in a HDD base. Conversely, metal HDD bases may require die cast processing and/or other forms of metal working, which typically results in less refined surfaces and at times, poor resolutions of miniature parts. Consequently, for metal HDD bases, a significant amount of post-machining is typically required to refine any rough edges and/or smoothen uneven surfaces resulting from prior metal working. In employing plastic as the material for producing the HDD base, the need for post-machining is eliminated or at least greatly reduced. As such, this further reduces the manufacturing cost of a plastic HDD base.

Another advantage of the plastic HDD base lies in the light-weight plastic used in the making of the HDD base. Due to the relative lightness of plastic, the finished HDD product is cheaper to transport and leads to significant savings in transport expenses. More particularly, a plastic HDD base bestows upon the designer more room for customization. For example, owing to the light weight of plastic, the increment in the total mass of material used becomes less of a concern. Consequently, a designer can afford to use more plastic material for producing a fuller and denser HDD base, without the need to design cavities and structures with the sole aim of reducing material content, that is so commonly seen in conventional metal HDD bases.

In one embodiment, the HDD base may be coated with a non-plastic coating. The non-plastic coating may be selected from a material that reduces the liquid particle count (LPC) emitted by the HDD base and is neither magnetic nor magnetizable in nature. The non-plastic coating may also be selected from an at least partially electrically conductive material. The non-plastic coating may also be non-conductive, such as an organic coating.

The non-plastic coating may be deposited on the surface of the HDD base via any suitable process, including but not limited to, physical vapor deposition (PVD) processes, spray-coating, and immersion. In one embodiment, the deposition process is a PVD process, such as, sputtering. Advantageously, a HDD base coated with the non-plastic coating is capable of reducing its liquid particle count (LPC) and thereby minimizes the risk of contaminating the HDD. In one embodiment, after having the non-plastic coating deposited thereon, the plastic HDD base may emit a substantially lower liquid particle count of not more than 400 particles/cm$^2$ at 0.3 µm. In another embodiment, the coated HDD base may emit a particle count of from about 150 to about 400 particles/cm$^2$ at 0.3 µm.

In another embodiment of the present disclosure, there is provided a process of making a HDD base, the process comprising forming the base made of plastic. In one embodiment, the formation step may be an injection molding step. The process may further comprise a step of coupling a rigid member to the HDD base. The coupling step may be selected from, but not limited to, insert molding and plastic overmolding.

In another embodiment of the present disclosure, there is provided a HDD comprising a base made of plastic.

Definitions

The following words and terms used herein shall have the meaning indicated:

As used herein, the term "liquid particle count" or LPC as used herein refers to a numerical measurement of the quantity and size of particles in in situ or flowing liquids. LPC is a measurement of the amount of particles emitted from a surface after an ultrasonic treatment in water at an ultra-sonic frequency of typically 68 kHz or 132 kHz, for particles of about 0.3 micrometers in diameter. Such measurements can be obtained using a commercially available Liquid Particle Counter such as the PMS LS-200-LIQUILAZ-SO2-HF from Quest Technology and is generally used to assess particulate cleanliness.

As used herein, the term "thermoplastic polymer" refers to any polymer which softens and flows when heated. Thermoplastic polymers may be heated and softened multiple times without suffering alterations to their characteristics. Such polymers are capable of being re-softened and re-worked, as long as the heating temperature does not exceed the decomposition temperature specific to the polymer.

As used herein, the term "thermoset polymer" refers to a cross-linked polymer which does not flow when heated. Such polymers become "set" once heat has been applied due to the formation of cross-linkages in the polymer. A thermoset polymer may not be re-softened or re-molded through a re-application of heat.

As used herein, the term "transition metal" refers to elements from Group III to Group XII in the Periodic Table. Exemplary transition metals include, but are not limited to, Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, and Cadmium.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments of the disclosed HDD plastic base will now be disclosed.

The HDD base may also be comprised of carbon-filled plastics.

The plastic may be selected from the group consisting of: thermoplastic polymers, thermoset polymers, elastomers and biodegradable polymers.

The thermoplastic polymers can be any suitable polymer selected from the group consisting of: acrylic alkene cyclicolefin co-polymers, cellulose acetates, cyclic-olefin copolymers, fluoropolymers, polyformaldehydes, vinyl acetates, vinyl alcohols, polyalkenes, polyacrylates, polyacrylonitriles, polyamides, polyamide-imides, polyaryletherketones, polyalkeneterephthalates, polycarbonates, polyhydroxyalkanoates, polyketones, polyesters, polyethylenes, polypropylene, polyetheretherketone, polyetherketoneketone, polyetherimide, polyethersulfone, polyimides, halogenated polyalkenes, polyalkene sulfides, polylactic acid and co-polymers thereof.

Exemplary thermoplastic polymers include, but are not limited to, acrylonitrile butadiene styrene, polytetrafluoroethylene, polyoxymethylene, ethylene vinyl acetate, ethylene vinyl alcohol, polybutadiene, polybutylene, polybutylene terephthalate, polycaprolactone, polychlorotrifluoroethylene, polyethylene terephthalate, polycyclohexylene dimethylene terephthalate, polyethylenechlorinates, polymethylpentene, polyphenylene oxide, polyphenylene sulfide, polyphthalamide, polypropylene, polystyrene, polysulfone, polytrimethylene terephthalate, polyvinyl acetate, polyvinyl chloride, polyvinylidene chloride, styrene acrylonitrile and co-polymers thereof. In one embodiment, the thermoplastic polymer is a polyetherimide.

Exemplary thermoset polymers include, but are not limited to, epoxy resins, phenyl formaldehydes, melamine formaldehydes, urea formaldehydes, polyurethane and co-polymers thereof.

Exemplary elastomers include, but are not limited to, styrene-ethylene-butylene-styrene (SEBS), styrene-butadiene-styrene (SBS), polyisoprene, nitrile butadiene, ethylene propylene rubber, butyl rubber, polybutadiene, chloroprene rubber, epichlorohydrin rubber, silicone rubber, fluorosilicone rubber, fluoroelastomers, perfluoroelastomers, polyether block amides, chlorosulfonated polyethylene, ethylene vinyl acetate, and co-polymers thereof.

Exemplary biodegradable polymers may include, but are not limited to, polyhydroxyalkanoate (PHA), polyhydroxybutyrate (PHB), polyhydroxyhexanoate (PHH), polyhydroxyvalerate (PHV), polylactic acid (PLA), polycaprolactone (PCL), polybutylene succinate (PBS), polybutylene succinate adipate (PBSA), aliphatic-aromatic copolyesters (AAC), polyethylene terephthalate (PET), polybutylene adipate/terephthalate (PBAT) and polymethylene adipate/terephthalate (PTMAT).

The plastic HDD base may have a material thickness of not less than 0.4 mm, preferably not less than 0.5 mm, more preferably not less than 0.6 mm.

The non-plastic, electrically conductive coating may be selected from the group consisting of: metal coatings, and carbon coatings. The non-plastic coating may also be selected from organic coatings, such as, silane-based coatings or a sprayable water-based epoxy. In one embodiment, the non-plastic coating may be a metal, metal alloys or a metal nitride. The metal, metal alloys or a metal nitride may comprise a transition metal as defined above. In a preferred embodiment, the non-plastic coating may be a nickel-vanadium alloy.

The coated HDD base may emit a substantially lower LPC of not more than 400 particles/cm$^2$ at 0.3 μm. In one embodiment, the coated HDD base may emit a particle count of from about 150 to about 400 particles/cm$^2$ at 0.3 μm. Advantageously, the lowered LPC reduces the risk of HDD contamination and corruption and minimizes HDD failures. Advantageously, the electrically conductive coating provides grounding means for the HDD and is capable of shielding the HDD from electromagnetic interference (EMI). Also advantageously, the electrically conductive coating prevents the build up of static charges on the surface of the coated HDD base. This helps to prevent the shorting of internal circuitry due to accumulated static charges.

In one embodiment, the non-plastic coating may be deposited onto the HDD base through sputtering. The sputtering process may be undertaken for a relatively short time per deposition cycle. In one embodiment, the sputtering may be undertaken for durations ranging from about 2 seconds to about 20 seconds per cycle. In another embodiment, the sputtering is undertaken for a duration of 20 seconds or less per cycle in order to deposit a coating having a thickness of about 200 nm. It should be noted that the sputtering duration can be adapted according to the desired thickness of the non-plastic coating. In a further embodiment, the sputtering step may be undertaken for less than 10 seconds per cycle.

The sputtering step may be undertaken in a sputtering chamber. The sputtering chamber may contain an inert gas such as nitrogen or argon to provide a plasma source. In one embodiment, the inert gas may be argon.

The sputtering step may be undertaken at a substantially low pressure, ranging from about 0.5 mtorr to about 15 mtorr.

The sputtering process may further comprise the step of depositing a first primer layer onto the surface of the HDD base, before sputtering the non-plastic coating thereon. Advantageously, the primer layer may be selected to provide good adhesion between the surface of the HDD base and the sputtered coating. In one embodiment, the primer layer may be a material selected from titanium or chromium.

The sputtering process may further comprise providing an additional protective layer on top of the sputtered coating in a thickness in the range of about 1 nm to about 20 nm. Advantageously, the additional top layer is selected to provide extra resistance to wear and to prevent scratching of the sputtered coating. In one embodiment, the additional top layer can be a diamond layer.

The protective coating may be deposited at a thickness of from about 80 nm to 1000 nm, from about 100 nm to about 900 nm, from about 100 nm to about 700 nm, from about 100 nm to about 500 nm, from about 100 nm to about 300, from about 100 nm to about 150 nm. In one embodiment, the protective coating may be deposited at a thickness of from about 100 nm to about 200 nm.

Exemplary, non-limiting embodiments of the disclosed HDD base according to the first aspect will now be disclosed.

The rigid member may be selected from any suitable material that has a high flexural modulus relative to Aluminum, which is typically 10,400,000 psi. The rigid member may have a flexural modulus that is larger than 10,400,000 psi. In one embodiment, the rigid member has a flexural modulus of equal to or larger than 27,000,000 psi. In one embodiment, the rigid member may be selected from the group consisting of steel, carbon steel, stainless steel, and nickel-alloys thereof. In a preferred embodiment, the rigid member is stainless steel.

The thickness of the rigid member may be in a range of from about 0.4 mm to about 2.0 mm, from about 0.5 mm to about 2.0 mm, from about 0.7 mm to about 1.8 mm, from about 0.9 mm to about 1.6 mm. In a preferred embodiment, the rigid member may be from about 0.4 mm to about 1.8 mm.

The shape, size and thickness of rigid member may be suitably optimized to achieve the desired structural strength.

For example, the rigid member may be optimized to the HDD's total resonance response upon impact, such that it is capable of securing the moving parts of the HDD in place.

In one embodiment, the rigid member may be formed of a continuous body that is disposed within a depression located in the HDD base cover. The depression in the HDD base cover may be configured to house a disk platter with a motor hub, a ramp pad, and a pivot emboss.

The HDD base comprising the rigid member may comprise plastic. In one embodiment, the HDD base comprising the rigid member may be substantially made of plastic.

In one embodiment, the rigid member may be coated with one or more protective coatings. The protective coating may be deposited on the rigid member via a sputtering process. The coating may be a non-plastic coating. In one embodiment, the coating may be a metal alloy comprising one or more transition metal elements. In another embodiment, the coating may comprise an alloy of nickel and vanadium.

The HDD base may comprise one or more connecting arms configured to couple the rigid member to the HDD base. In one embodiment, the one or more connecting arms may be configured to extend from an adjacent edge of the rigid member to an adjacent edge of the HDD base. In another embodiment, the plural connecting arms may be continuous extensions of the rigid member configured to couple the rigid member to the HDD base.

In another embodiment, the adjacent edge of the rigid member is on an actual edge thereof or is proximal thereto. In another embodiment, the adjacent edge of the HDD base is on an actual edge thereof or is proximal thereto.

In one embodiment, the rigid member may lie flush with the HDD base.

The plural connecting arms of the rigid member may extend substantially around the perimeter of the rigid member and respectively extend to the edge of the HDD base. In one embodiment, there are six connecting arms extending from the edges of the rigid member to the edges of the HDD base. The plural connecting arms may be configured to lie flush with the edges of the rigid member. In one embodiment, the ends of the connecting arms extend are configured to abut the edges of the HDD base. In one embodiment, a portion of the ends of the connecting arms vertically extend from the rigid member to abut a vertical edge of the HDD base while the adjacent ends abut a horizontal plane of the HDD base.

In one embodiment, the rigid member and connecting arms are formed from a unitary body, such as a pressed metal unitary body. In one embodiment, the plural connecting arms are disposed in or about a common plane as the rigid member.

Each of the connecting arms may comprise a conduit for receiving a fastening means for fastening the rigid member to the HDD base. In one embodiment, the conduit may be aligned with a corresponding conduit located on the HDD base also for receiving the same fastening means, such that the fastening means fastens the rigid member to the HDD base. In another embodiment, the conduit for receiving the fastening means for fastening the rigid member to the HDD base is aligned with a conduit of the HDD base for receiving the fastening means that also fastens a HDD top cover to the HDD base. In one embodiment, the fastening means is a screw.

The connecting arms may comprise an elevated section adjacent to the conduit located on the terminal ends of the connecting arms. The elevated section may be substantially perpendicular to the section of the connecting arm that is adjacent to the edge of the rigid member. In one embodiment, the conduits located at the terminal end of the connecting arms may be disposed within an elevated plane relative to the plane on which the rigid member is disposed.

In one embodiment, the conduit is located at a corner of the HDD base. In another embodiment, the conduit is located along a side of the HDD base. The conduits may have a grooved internal surface for mating with the helical thread of a screw. In one embodiment, the conduits on the connecting arms are configured to receive a screw.

The HDD base may comprise at least one connecting arm. In one embodiment, the HDD base comprises at least two connecting arms. In another embodiment, the HDD base comprises at least six connecting arms. It will be appreciated that the number of connecting arms can be adjusted to achieve a balance between having stronger physical bonding between the rigid member and the HDD base and having a sufficiently lightweight HDD base which preferably should contain as little metallic material as possible.

The rigid member may be comprised of the same material as the rigid member, for example, stainless steel.

Advantageously, in one embodiment, the connecting arms provide additional rigidity, on top of that imparted by the rigid member, to the HDD base.

Further advantageously, the connecting arms are capable of securing the rigid member to the HDD base. In particular, the connecting arms keep the rigid member in a substantially fixed position relative to the HDD base and, in some embodiments, the HDD top cover. This prevents the rigid member from being displaced from its original location during physical impact and as such prevents damage from being caused to sensitive components housed within the HDD, such as the magnetic disk platter.

Further advantageously, the conduits allow the HDD base, the rigid member and the HDD top cover to be fastened together via the fastening means. In one embodiment, the fastening means is composed of an electrically conductive material, such as a metallic screw. When assembled, an electrical connection is established between the HDD top cover (which is metalized) and the rigid member. Advantageously, the rigid member may be used to provide electrical grounding for the assembled HDD. This is useful as HDD top covers are typically segregated from the HDD base via a non-conductive seal. As such, having the rigid member in electrical communication with the HDD top cover provides a useful grounding means and negates a need to fashion additional internal circuitry for grounding purposes.

In the disclosed process for making a HDD, the formation step may comprise injection molding the plastic. The injection molding may be carried out at a temperature in a range of from about 120° C. to about 250° C. It should be appreciated that the temperature used may vary according to the plastic material employed in the making of the HDD base. According to one embodiment, the plastic is a PEI and the plastic is injection molded at about 180° C. Other suitable plastics for use are as disclosed above.

The HDD according to the second aspect may comprise at least three anchor formations. The anchor formations may be respectively configured to couple to and anchor the motor hub, ramp pad and pivot emboss of the HDD. The rigid member may be configured to hold at least two or more anchor formations in a fixed position relative to each other, on a common plane. In one embodiment, the rigid member may be configured to hold three anchor formations. The disclosed HDD may comprise a HDD base as defined above according to the first aspect.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 5c shows an assembled HDD in accordance with an embodiment of the present disclosure, wherein the HDD base is as shown in FIG. 5a.

DETAILED DESCRIPTION OF DRAWINGS

Figure 1:
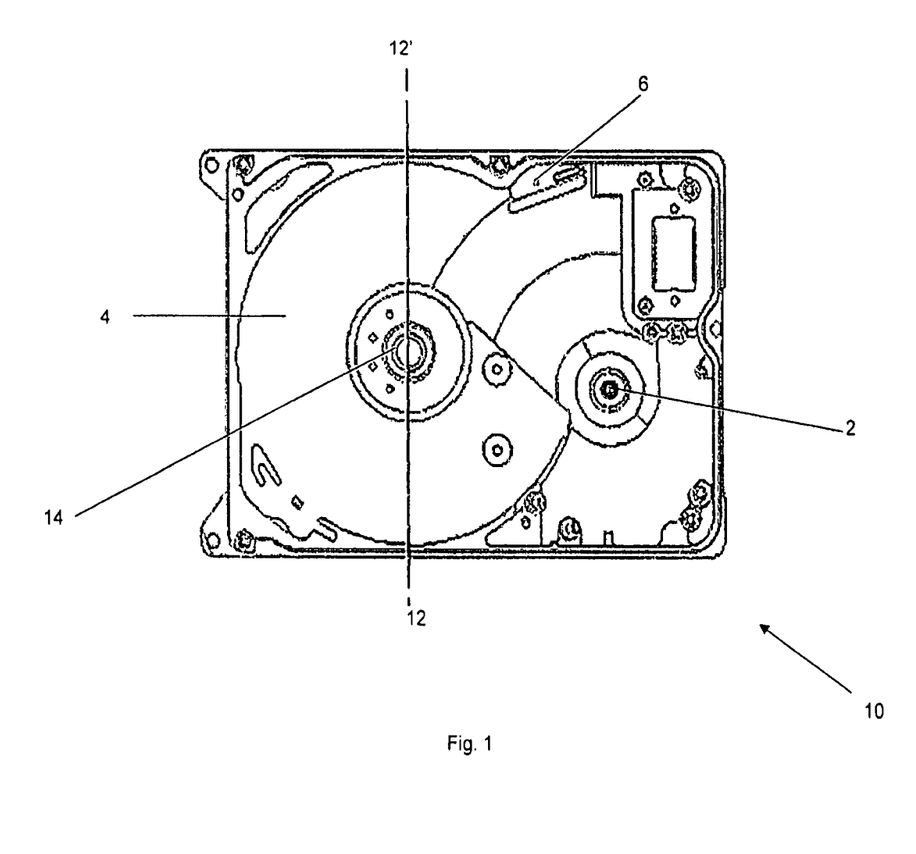
FIG. 1 is a schematic diagram showing the layout of a plastic HDD base in accordance with one embodiment of the present invention.

Referring now to FIG. 1, there is shown a plastic HDD base 10 in accordance with one embodiment of the present disclosure. The HDD base 10 consists of a depression 4 for housing a magnetic platter, a motor hub 14 for housing a motor, which is mechanically engaged to the magnetic platter, a pivot emboss 2 and a ramp pad 6 for engaging and securing an actuator arm (not shown).

The HDD base 10 is made up of a plastic material such as, a polyetherimide (PEI). The plastic HDD base is made by injection molding. The plastic HDD base is coated with a thin layer of non-plastic coating having a thickness of about 200 nm. The non-plastic coating is a metallic coating comprised of nickel alloyed with vanadium.

When assembled as a HDD, the depression 4 houses one or more magnetic platters which provide the data storage medium. The motor is responsible for spinning the magnetic platter(s) as data is being read from or written onto the magnetic medium.

When assembled, an actuator arm (not shown) is affixed onto the pivot 2 and extends over and above the magnetic platter. On the end of the actuator arm hovering over the magnetic platter, there is provided a pair of magneto-resistive read/write heads, for reading and writing data from and to the magnetic platter. When not in use, the actuator arm is parked in a ramp pad 6. Ramp pad 6 is capable of engaging and securing the actuator arm in place to prevent contact between the magneto-resistive heads and the magnetic platter, thereby preventing hard disk damage when HDD is not in use.

Figure 4A:
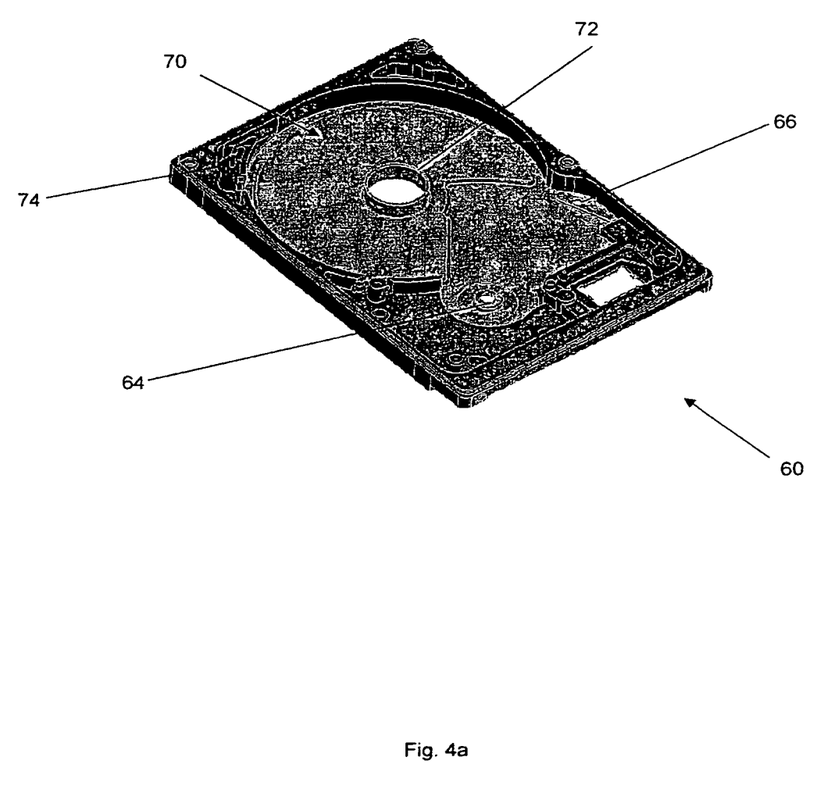
FIG. 4a shows a HDD base in accordance with another embodiment of the present invention, where a rigid member is included.

Turning now to FIG. 4a, there is shown another embodiment of a HDD base 60 in accordance with the present invention. A rigid member 70 is encased within an outer plastic frame 74. The rigid member 70 is made of stainless steel and comprises three anchor formations for anchoring parts of the HDD. These anchor formations include the ramp pad 66, the motor hub 72 and the pivot emboss 64. Rigid member 70 serves to retain and secure ramp pad 66, motor hub 72 and the pivot emboss 64 in fixed positions relative to each other. Rigid member also ensures that the ramp pad 66, motor hub 72 and the pivot emboss 64 are in a common plane.

Figure 4B:
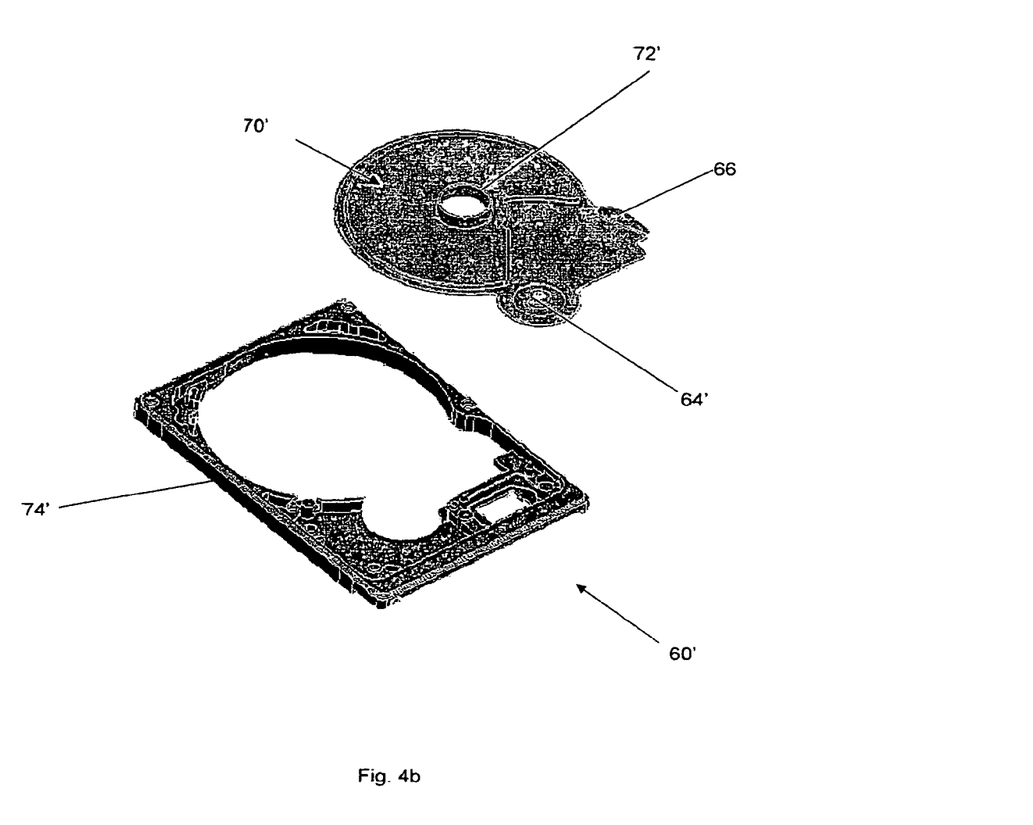
FIG. 4b shows the same HDD base as in FIG. 4a but with the rigid member separated for illustration purposes.

FIG. 4b illustrates the rigid member 70' as being a modular component of the HDD base 60'. The reference numbers used in FIG. 4b correspond to those in FIG. 4a, differentiated by a "'" punctuation, and refer to the same features. In this embodiment, rigid member 70' is coupled to the outer plastic frame 74' by insert molding.

Figure 2:
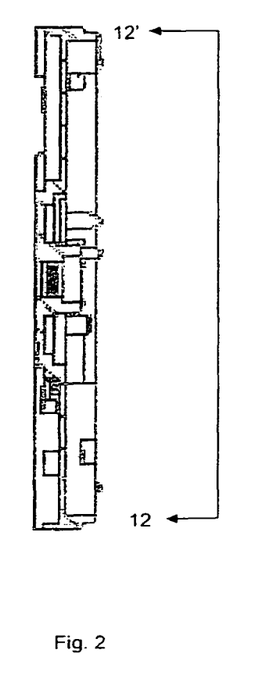
FIG. 2 shows a cross-section 12-12' of the plastic HDD base in FIG. 1.

FIG. 2 shows a cross section of the section 12-12' of FIG. 1.

Figure 3:
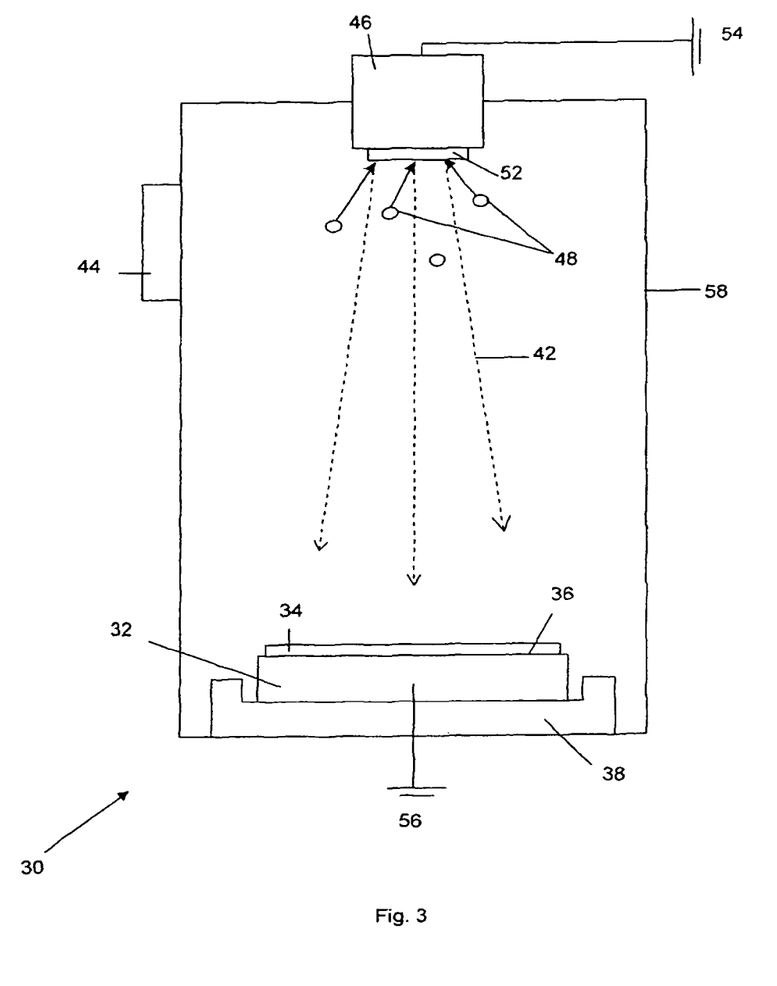
FIG. 3 depicts a sputtering apparatus for depositing a protective layer of metal over the surface of a HDD base cover.

Now referring to FIG. 3, there is depicted an exemplary sputtering apparatus 30 for depositing a protective coating onto a plastic HDD base 32. A target metal 52, a nickel-vanadium alloy, is selected as a cathode 46 and biased with a negative potential 54. A diametrically opposed substrate holder 38 is provided as an anode and is biased with a positive potential 56 to generate an electric field existing between the cathode 46 and a plastic HDD base 32. The electric field generated by the opposing electrodes ionizes the inert gas particles 48 and provides a source of plasma for bombarding the surface of target metal 52. Upon bombardment by the plasma particles, cathode particles 42 are ejected from the surface of target metal 52 and travels towards the plastic HDD base 32. The voltages of the anode and cathode are selected to achieve a sputtering power in a range of about 4000 watts to 9000 watts.

The substrate holder 38 may be coupled to a moving means such as a rotatable mount (not shown) and may be capable of transporting the plastic HDD base 32 into the sputtering chamber 58 for sputtering and thereafter out of the sputtering chamber 58 upon completion of the deposition process.

The sputtering chamber 58 is typically filled with an inert gas 48 such as argon or nitrogen. The ejected particles 42 impinges onto the surface 36 of the HDD base 32 and thereby deposit a protective layer 34 thereon. The pressure of the sputtering chamber 58 is kept substantially low mainly to avoid gas scattering and collisions with the ejected cathode material 42. Preferably, the pressure of the sputtering chamber 58 is maintained at a pressure ranging from about 0.5 mtorr to about 15 mtorr. The sputtering step may be undertaken for a duration of about 20 seconds per deposition cycle. Each deposition cycle can be capable of depositing a metal protective layer 34 onto the surface 36 of HDD base 32, which is at least 100 nm to 200 nm in thickness.

An optional magnetic source 44 may be provided coupled with the sputtering chamber 58 for adjusting the direction of motion of the ejected particles 42 from the target metal 52. The magnetic source 44 may be suitably configured such that magnetic flux lines intersect the surface of the emitting surface of the cathode. Advantageously, the presence of the magnetic flux may direct the ejected particles 42 over the surface 36 of the HDD base 32. The magnetic flux is also capable of directing the ejected particles 42 over the HDD base 32 such that the resultant deposited protective layer 34 is substantially uniform in thickness.

Figure 5A:
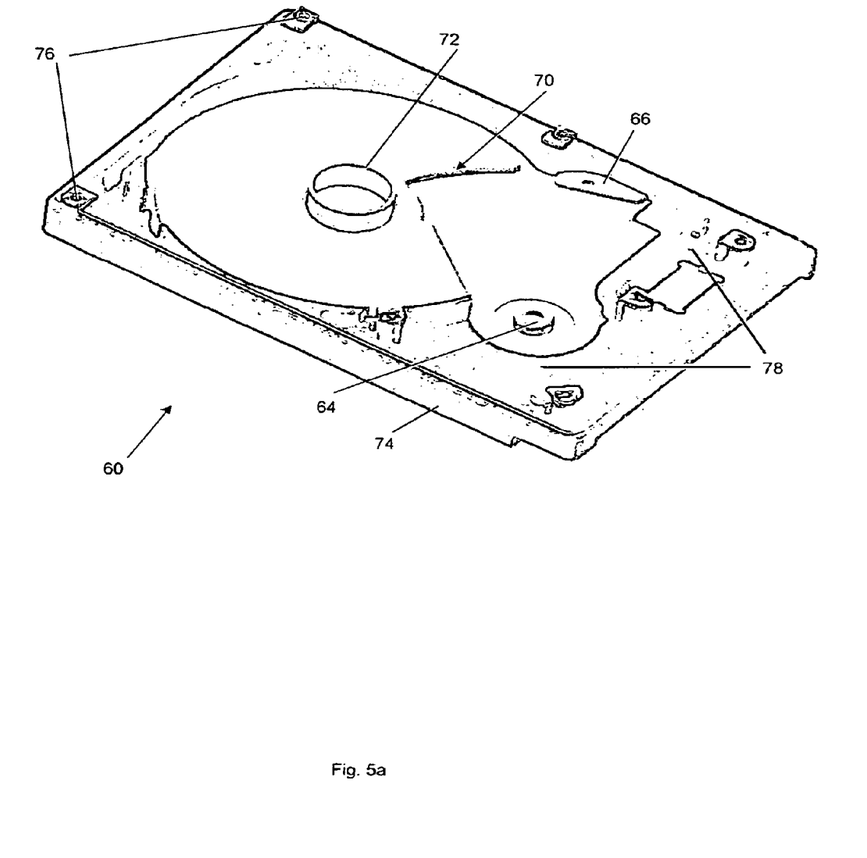
FIG. 5a shows a HDD base in accordance with another embodiment of the present invention, wherein the HDD base comprises connecting arms for coupling the rigid member to the HDD base.

Now referring to FIG. 5a, there is shown a HDD base 60 in accordance with another embodiment of the present invention. For consistency, the numerals used in FIG. 5a are the same as the numerals used in FIG. 4a when referring to the same features in the HDD base 60.

The HDD base 60 comprises an external casing 74 and a rigid member 70. The HDD base 60 comprises six connecting arms 78 extending from the edges of the rigid member 70 to couple with the edges of the HDD casing 74. The connecting arms 78 are flushed with the rigid member 70 and are obscured from view by the casing 74 in this figure. The connecting arms 78 will be further described below with reference to FIG. 5b. Each of the connecting arms 78 comprises a conduit 76, which is aligned with another conduit (not shown) located on a corresponding position on casing 74. Both the conduit 76 and the corresponding conduit located on casing 74 are configured to receive a fastening means, in the form of a screw, which is capable of fastening the rigid member 70 to the casing 74, thereby securing each component in a fixed position relative to the other component.

The rigid member 70 and the connecting arms 78 are made of stainless steel. As described above, the rigid member 70 serves to anchor at least three parts of the HDD including the ramp pad 66, the motor hub 72 and the pivot emboss 64. In so doing, the rigid member 70 retains and secures the ramp pad 66, motor hub 72 and the pivot emboss 64 in fixed positions relative to each other and maintains these anchor formations in or about a common plane. In this particular embodiment, the connecting arms 78 provide additional rigidity to the HDD base, which may be composed predominantly of a plastic material. Furthermore, the connecting arms 78 act to further secure the rigid member 70 to the HDD casing 74. During physical impact to the HDD, the connecting arms 78 provide additional anchorage to secure the rigid member 70 in place relative to the casing 74. This prevents the rigid member 70 from being displaced from its original position, which may cause damage to the other sensitive components in the HDD, such as the magnetic disk platter.

Although not shown in FIG. 5*a*, the fastening means may also be used to fasten a HDD top cover to a HDD base 60 comprising the rigid member 70. In such a configuration, the HDD top cover becomes electrically coupled to the rigid member 70 through the electrically conductive fastening means and the connecting arms 78. As such, the rigid member 70 provides the additional function of providing grounding means for the assembled HDD.

Figure 5B:
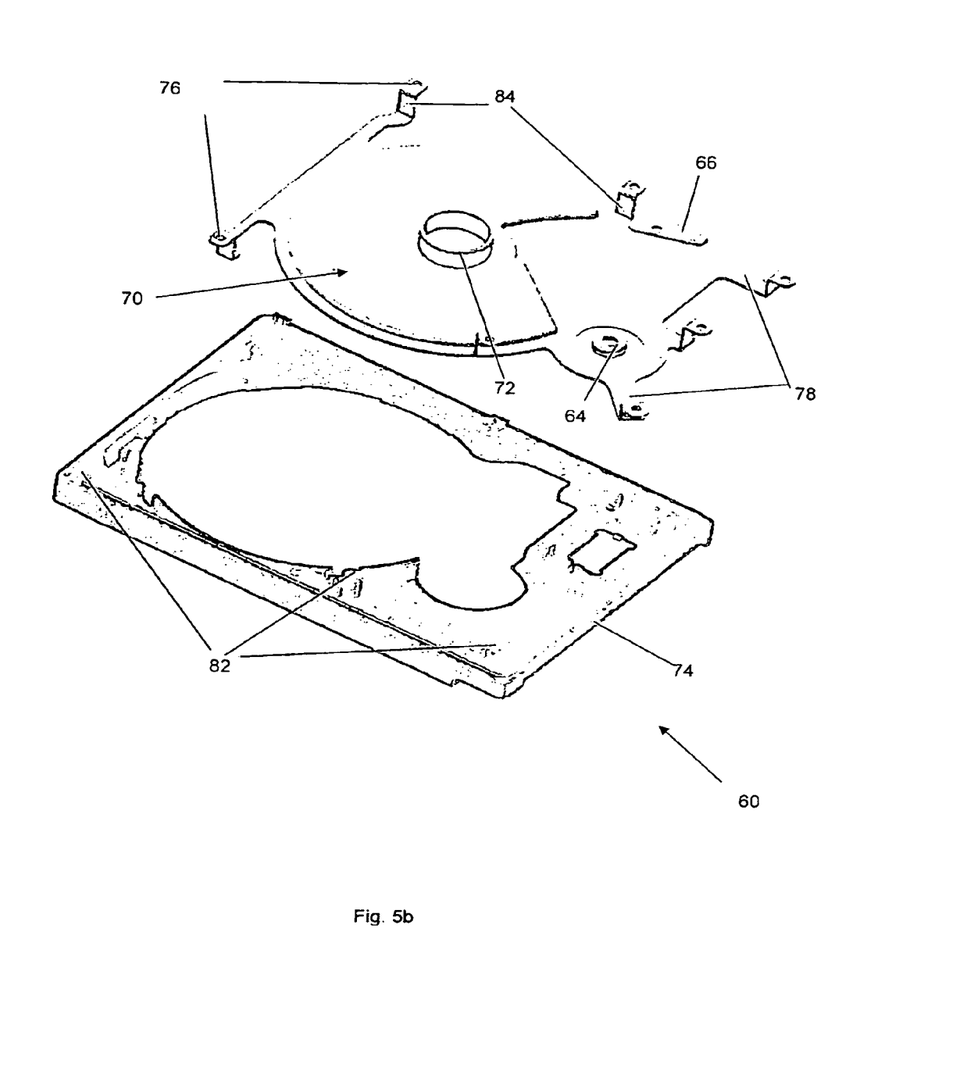
FIG. 5b shows the same HDD base as shown in FIG. 5a but with the rigid member separated for illustration purposes.
Figure 5C:
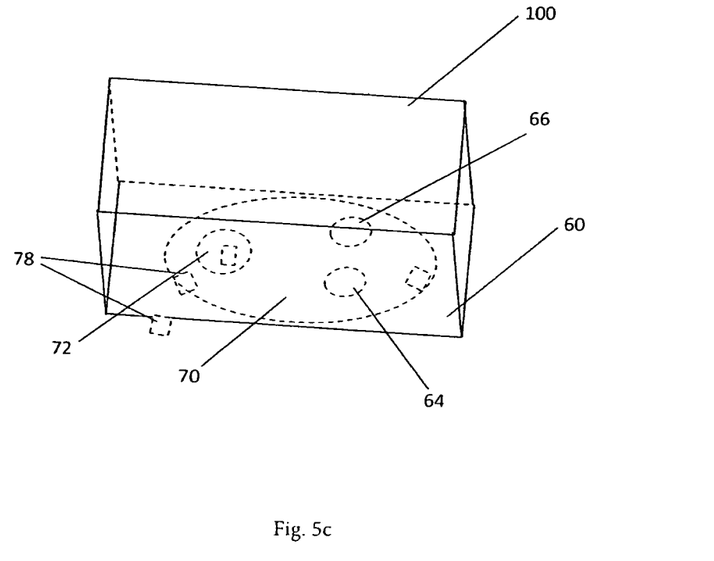

FIG. 5*c* illustrates a HDD top cover 100 fastened to a HDD base 60 by electrically conductive fastening means (not shown) and the connecting arm 78 to provide an assembled HDD.

FIG. 5*b* illustrates the rigid member 70 of FIG. 5*a* existing as a modular component of the HDD base 60. The reference numerals used in FIG. 5*b* are the same as the numerals used in FIG. 5*a* when referring to the same HDD features. FIG. 5*b* shows the casing 74 comprising conduits 82 located along the edges of casing 74 for receiving a fastening means. When the HDD base 60 is being assembled, the conduits 82 are in alignment with the conduits 76 disposed at the terminal ends of the connecting arms 78. The rigid member 70 and associated connecting arms 78 are formed from a pressed metal sheet. The conduits 76 of the connecting arms are formed by drilling holes through the sheet and forming a thread thereon for engagement with a fastening means in the form of a screw (not shown). Accordingly, the screw that threads into the conduits 76 is capable of threading and fastening the corresponding conduits 82 of the HDD casing 74, thereby fastening both rigid member 70 and HDD casing 74 and securing them in a fixed position relative to each other. The connecting arms 78 are extensions of the rigid member 70 and form a unitary body with the rigid member. The connecting arms 78 also comprise an elevated section 84 that is adjacent to the conduits 76 located at the terminal ends of the connecting arms. The elevated section 84 of the connecting arm is approximately perpendicular to a preceding section of the connecting arm 78 which is adjacent to and extends from an edge of the rigid member 70. The elevated section 84 is configured such that when the HDD base is assembled, the conduit 76 is in substantial alignment with conduit 82 in order for both conduits (76, 82) to receive a fastening means for securing the casing 74 and the rigid member 70 in place.

APPLICATIONS

The disclosed HDD base is made of plastic and is therefore cheaper to produce as compared to HDD bases made of metal parts. More particularly, due to plastic being substantially lighter than metal, the disclosed HDD base is also cost effective to transport over long distances, whether by air or marine means.

The disclosed HDD base can be produced readily by plastic molding methods, such as injection molding. As such, the disclosed HDD base can be constructed in a precise manner, negating the need for cumbersome and costly post-machining processes commonly demanded by conventional metallic HDD covers. This further increases the cost effectiveness of the disclosed HDD bases.

Furthermore, the disclosed plastic HDD base can afford to be produced with more material as compared to conventional HDDs due to the relative lighter weight of plastic. Accordingly, as more material may be used, the disclosed plastic HDD base can be designed thicker which can confer improved strength and structural integrity.

In addition, the disclosed HDD base is also more resistant to physical impact due to the presence of a rigid member. The rigid member is capable of securing at least two anchor formations on the HDD base in place, thus preventing movement of the anchor formations relative to each other. Advantageously, the rigid member is capable of preventing moving parts in the HDD from damaging the magnetic media in the event of physical impact or trauma. Furthermore, the HDD base may further comprise connecting arms extending from the edges to reinforce the rigidity of the HDD base and may act to secure the rigid member to the HDD base. Even further, the connecting arms of the rigid member may provide an electrical connection between a HDD top cover and the rigid member to thereby provide grounding means for the HDD.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed:

1. A hard disk drive (HDD) base comprising:
a motor hub anchor formation, a ramp pad anchor formation and a pivot emboss anchor formation, said anchor formations being integrally formed on a unitary rigid member and being configured on said unitary rigid member to retain said anchor formations in a fixed position relative to each other and in a common plane.

2. The HDD base as claimed in claim 1, comprising one or more connecting arms configured to couple the unitary rigid member to the HDD base.

3. The HDD base as claimed in claim 2, wherein the one or more connecting arms are configured to extend from an adjacent edge of the unitary rigid member to an adjacent edge of the HDD base.

4. The HDD base as claimed in claim 2, wherein the connecting arms comprise a conduit for receiving a fastening means for fastening the unitary rigid member to the HDD base.

5. The HDD base as claimed in claim 4, wherein the conduit for receiving the fastening means for fastening the unitary rigid member to the HDD base is aligned with a conduit of the HDD base for receiving the fastening means, the fastening means being capable of also fastening a HDD top cover to the HDD base.

6. The HDD base as claimed in claim 4, wherein the conduits on the connecting arms are configured to receive a screw.

7. The HDD base as claimed in claim 1, wherein plural connecting arms extend substantially around the perimeter of the unitary rigid member and respectively extend to the edge of the HDD base.

8. The HDD base as claimed in claim 7, wherein six connecting arms extend from the edges of the unitary rigid member to the edges of the HDD base.

9. The HDD base as claimed in claim 1, wherein said unitary rigid member is comprised of a metal or metallic material.

10. The HDD base as claimed in claim 9, wherein said metal material is selected from the group consisting of: steel, carbon steel, stainless steel and nickel-alloys thereof.

11. The HDD base as claimed in claim 1, wherein said unitary rigid member has a thickness dimension of 0.4 mm to 2.0 mm.

12. The HDD base as claimed in claim 1, wherein said HDD base comprises plastic.

13. The HDD base as claimed in claim 12, wherein said HDD base is substantially comprised of plastic.

14. The HDD base as claimed in claim 12, wherein said plastic is selected from the group consisting of thermoplastic polymers, thermoset polymers, elastomers, biodegradable polymers and co-polymers thereof.

15. The HDD base as claimed in claim 14, wherein said plastic is a polyetherimide.

16. The HDD base as claimed in claim 1, wherein the average material thickness of the HDD base is not less than 0.6 mm.

17. A HDD comprising:
a HDD base comprising a motor hub anchor formation, a ramp pad anchor formation and a pivot emboss anchor formation,
wherein said anchor formations are integrally formed on a unitary rigid member and being configured on said unitary rigid member to retain said anchor formations in a fixed position relative to each other and in a common plane.

18. The HDD as claimed in claim 17, comprising one or more connecting arms configured to couple the unitary rigid member to the HDD base.

19. The HDD as claimed in claim 18, wherein the one or more connecting arms are configured to extend from an adjacent edge of the unitary rigid member to an adjacent edge of the HDD base.

20. The HDD as claimed in claim 18, wherein the connecting arms comprise a conduit for receiving a fastening means for fastening the unitary rigid member to the HDD base.

21. The HDD as claimed in claim 20, wherein the conduit for receiving the fastening means for fastening the unitary rigid member to the HDD base is aligned with a conduit of the HDD base for receiving the fastening means that also fastens a HDD top cover to the HDD base.

22. The HDD as claimed in claim 20, wherein the conduits on the connecting arms are configured to receive a screw.

23. The HDD as claimed in claim 17, wherein plural connecting arms extend substantially around the perimeter of the unitary rigid member and respectively extend to the edge of the HDD base.

24. The HDD as claimed in claim 23, wherein six connecting arms extend from the edges of the unitary rigid member to the edges of the HDD base.

25. An assembled HDD comprising:
a HDD top cover; and
a HDD base comprising a motor hub anchor formation, a ramp pad anchor formation and a pivot emboss anchor formation, wherein said anchor formations are integrally formed on a unitary rigid member and being configured on said unitary rigid member to retain said anchor formations in a fixed position relative to each other and in a common plane,
wherein said unitary rigid member is electrically coupled to the HDD top cover to provide electrical grounding for the assembled HDD.

* * * * *